United States Patent
Terashima (10) Patent No.: US 8,936,323 B2
(45) Date of Patent: Jan. 20, 2015

(54) BRAKE APPARATUS

(75) Inventor: Kazuya Terashima, Isehara (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 565 days.

(21) Appl. No.: 13/301,928

(22) Filed: Nov. 22, 2011

(65) Prior Publication Data

US 2012/0139333 A1 Jun. 7, 2012

(30) Foreign Application Priority Data

Dec. 6, 2010 (JP) .................................. 2010-271208

(51) Int. Cl.
*B60T 8/42* (2006.01)
*B60T 13/66* (2006.01)
*B60T 13/14* (2006.01)
*B60T 13/68* (2006.01)

(52) U.S. Cl.
CPC ............. *B60T 13/662* (2013.01); *B60T 13/145* (2013.01); *B60T 13/686* (2013.01)
USPC .................. 303/115.1; 303/115.4; 137/505.42

(58) Field of Classification Search
USPC ............. 303/113.1, 115.1, 115.4, 119.2, 901, 303/DIG. 10; 137/505.42, 505.37, 505.41, 137/505.45; 138/30, 31
See application file for complete search history.

(56) References Cited

U.S. PATENT DOCUMENTS

| 7,543,896 B2 | 6/2009 | Ariki et al. |
| 8,215,724 B2* | 7/2012 | Aoba et al. ................. 303/115.4 |
| 2010/0052417 A1* | 3/2010 | Aoba et al. ................. 303/115.4 |
| 2012/0139331 A1* | 6/2012 | Terashima et al. .............. 303/10 |
| 2012/0139332 A1* | 6/2012 | Terashima et al. ......... 303/115.1 |

FOREIGN PATENT DOCUMENTS

| JP | 11-208440 | 8/1999 |
| JP | 2006-151362 | 6/2006 |
| JP | 3937554 | 4/2007 |
| JP | 2008-106905 | 5/2008 |

* cited by examiner

Primary Examiner — Vishal Sahni
(74) Attorney, Agent, or Firm — Antonelli, Terry, Stout & Kraus, LLP.

(57) ABSTRACT

A brake apparatus including a housing with a fluid passage, a piston body disposed within a closed-ended bore of the housing and communicated with the fluid passage, a first elastic member biasing the piston body toward a closed end of the bore, a valve element disposed in the fluid passage, a seat portion coming into contact with the valve element, a rod disposed between a crown surface of the piston body and the valve element, a second elastic member biasing the valve element toward the seat portion, a rod supporting hole portion that supports one end side of the rod, a rod outer circumferential passage portion disposed on the other end side of the rod and having an inner diameter larger than an inner diameter of the rod supporting hole portion, and at least one communicating hole portion that communicates the rod outer circumferential passage portion and the bore.

20 Claims, 6 Drawing Sheets

FIG.7

BRAKE APPARATUS

BACKGROUND OF THE INVENTION

The present invention relates to a brake apparatus that has a reservoir function of reserving a brake fluid.

Japanese Patent Application Unexamined Publication No. 2008-106905 discloses a brake apparatus useable in an anti-lock brake system (ABS), etc., which includes a piston for a reservoir, a pressure regulating valve disposed above the piston, the pressure regulating valve including a guide for supporting a rod, and a passage portion that is formed separately from the guide and allows brake fluid to pass therethrough.

SUMMARY OF THE INVENTION

However, in the above-described conventional art, a fluid passage formed on an outer circumferential side of the rod is narrow, whereby there may occur an increased flow resistance in pipes or ducts.

It is an object of the present invention to provide a brake apparatus having a low flow resistance in pipes or ducts.

The other objects and features of this invention will become understood from the following description with reference to the accompanying drawings.

In one aspect of the present invention, there is provided a brake apparatus including:

a housing in which a fluid passage is formed;

a piston body disposed within a closed-ended bore formed in the housing, the bore being communicated with the fluid passage;

a first elastic member that biases the piston body toward a closed end of the bore;

a valve element disposed in the fluid passage;

a seat portion that is brought into contact with the valve element;

a rod disposed between a crown surface of the piston body and the valve element, the rod acting to move the valve element apart from the seat portion, a second elastic member having one end contacted with the valve element and biasing the valve element toward the seat portion, the second elastic member having an elastic force smaller than that of the first elastic member, a rod supporting hole portion that supports one end side of the rod such that the rod is slidably moveable in the rod supporting hole portion in an axial direction of the rod;

a rod outer circumferential passage portion that is disposed on the other end side of the rod and has an inner diameter larger than an inner diameter of the rod supporting hole portion; and at least one communicating hole portion that communicates the rod outer circumferential passage portion and the bore.

In a further aspect of the present invention, there is provided a brake apparatus including:

a housing in which a fluid passage is formed;

a piston body disposed within a closed-ended bore formed in the housing, the bore being communicated with the fluid passage, a first elastic member that biases the piston body toward a closed end of the bore;

a valve element disposed in the fluid passage;

a seat portion that is brought into contact with the valve element;

a rod disposed between a crown surface of the piston body and the valve element, the rod acting to move the valve element apart from the seat portion, a second elastic member having one end contacted with the valve element and biasing the valve element toward the seat portion, the second elastic member having an elastic force smaller than that of the first elastic member, and a communication member disposed in the fluid passage, the communication member including:

a rod supporting hole portion that supports one end side of the rod such that the rod is slidably moveable in the rod supporting hole portion in an axial direction of the rod;

a rod outer circumferential passage portion that is disposed on the other end side of the rod and has an inner diameter larger than an inner diameter of the rod supporting hole portion; and at least one communicating hole portion that communicates the rod outer circumferential passage portion and the bore.

In a still further aspect of the present invention, there is provided a brake apparatus including:

a housing in which a fluid passage is formed;

a piston body disposed within a closed-ended bore formed in the housing, the bore being communicated with the fluid passage, a first elastic member that biases the piston body toward a closed end of the bore;

a valve element disposed in the respective fluid passages;

a seat portion that is brought into contact with the valve element;

a rod disposed between a crown surface of the piston body and the valve element, the rod acting to move the valve element apart from the seat portion, a second elastic member having one end contacted with the valve element and biasing the valve element toward the seat portion, the second elastic member having an elastic force smaller than that of the first elastic member, a rod supporting hole portion that supports the rod such that the rod is slidably moveable;

a rod outer circumferential passage portion formed between the rod supporting hole portion and the seat portion-along an axial direction of the rod, the rod outer circumferential passage portion having an inner diameter larger than an inner diameter of the rod supporting hole portion, and at least one communicating hole portion that communicates the rod outer circumferential passage portion and the bore.

The brake apparatus of the present invention can use a space between an outer circumferential surface of the rod and an inner circumferential surface of a passage forming member (a communication member) as a fluid passage, thereby ensuring an effective sectional area of the fluid passage and reducing a flow resistance in the fluid passage.

DETAILED DESCRIPTION OF THE INVENTION

Referring to FIG. 1 to FIG. 7, a brake apparatus according to an embodiment of the present invention will be explained hereinafter.

[Construction of Hydraulic Circuit of Hydraulic Brake Control System]

Figure 1:
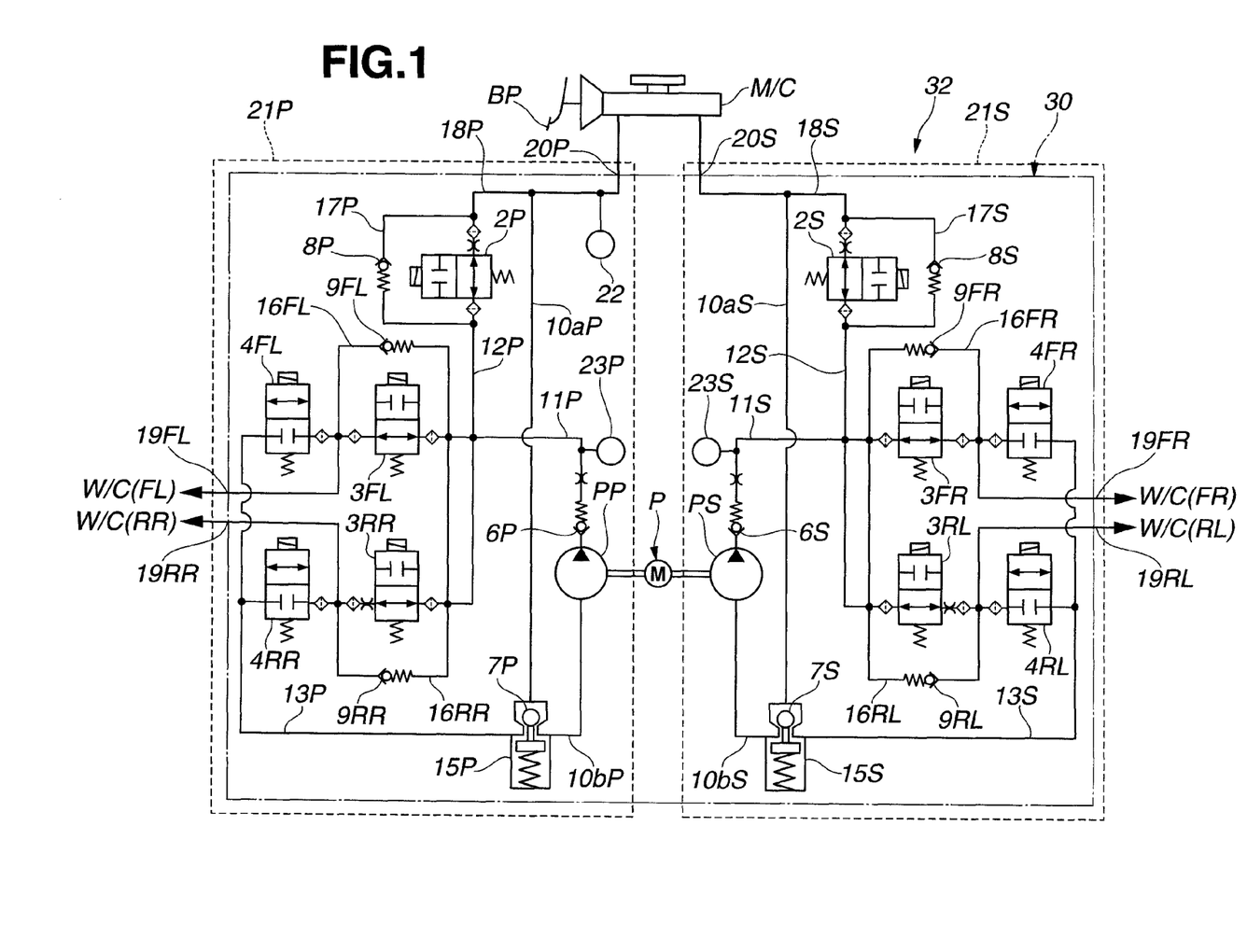
FIG. 1 is a hydraulic circuit diagram of a hydraulic brake control system to which a brake apparatus according to an embodiment of the present invention is applicable.

FIG. 1 is a hydraulic circuit diagram of hydraulic brake control system 32 according to an embodiment of the present invention. As shown in FIG. 1, the hydraulic circuit is formed in hydraulic control unit 30 disposed between master cylinder M/C and wheel cylinder W/C. Hydraulic control unit 30 includes generally rectangular solid-shaped housing 31 cut out from an aluminum block, and a plurality of fluid passages formed in housing 31, pump unit P, motor M, and a plurality of valves as explained below.

Hydraulic brake control system 32 performs hydraulic control in accordance with the hydraulic pressure requested in vehicle dynamics control (VDC) and anti-lock brake system (ABS) control by a controller. Hydraulic brake control system 32 has a so-called X piping construction including two systems constituted of P system hydraulic circuit 21P and S system hydraulic circuit 21S. Wheel cylinder W/C(FL) for a left front wheel and wheel cylinder W/C(RR) for a right rear wheel are connected to the P system. Wheel cylinder W/C(FR) for a right front wheel and wheel cylinder W/C(RL) for a left rear wheel are connected to the S system. Hydraulic brake control system 32 and respective wheel cylinders W/C are connected to wheel cylinder ports 19RL, 19FR, 19FL, 19RR which are formed on an upper surface of housing 31. Pump unit P is a tandem gear pump in which rotary gear pumps PP and PS constituted of a pair of external gears and disposed in the P system and the S system, respectively, are driven by single motor M.

Master cylinder M/C and hydraulic control unit 30 are connected with each other through fluid passages 18P, 18S and master cylinder ports 20P, 20S formed on a port connecting surface of housing 31. Fluid passage 18P and a suction side of gear pump PP are connected with each other through fluid passages 10aP, 10bP. Fluid passage 18S and a suction side of gear pump PS are connected with each other through fluid passages 10aS, 10bS. Master cylinder pressure sensor 22 is disposed on fluid passage 18P between master cylinder port 20P and a connecting portion in which fluid passage 18P is connected with fluid passage 10aP.

A discharge side of gear pump PP and respective wheel cylinders W/C(FL), W/C(RR) are connected with each other through fluid passages 11P. A discharge side of gear pump PS and respective wheel cylinders W/C(FR), W/C(RL) are connected with each other through fluid passages 11S. Pressure increasing valves 3FL, 3RR corresponding to wheel cylinders W/C(FL), W/C(RR) are disposed on fluid passage 11P, which are a solenoid valve of a normally open type. Pressure increasing valves 3FR, 3RL corresponding to wheel cylinders W/C(FR), W/C(RL) are disposed on fluid passage 11S, which are a solenoid valve of a normally open type. Check valve 6P is disposed on fluid passage 11P between gear pump PP and pressure increasing valves 3FL, 3RR. Check valve 6P allows a flow of brake fluid in a direction from gear pump PP toward pressure increasing valves 3FL, 3RR and inhibits a flow of brake fluid in a reverse direction from pressure increasing valves 3FL, 3RR toward gear pump PP. Check valve 6S is disposed on fluid passage 11S between gear pump PS and pressure increasing valves 3FR, 3RL. Check valve 6S allows a flow of brake fluid in a direction from gear pump PS toward pressure increasing valves 3FR, 3RL and inhibits a flow of brake fluid in a reverse direction from pressure increasing valves 3FR, 3RL toward gear pump PS. Discharge pressure sensor 23P is disposed on fluid passage 11P between pressure increasing valves 3FL, 3RR and gear pump PP. Discharge pressure sensor 23S is disposed on fluid passage 11S between pressure increasing valves 3FR, 3RL and gear pump PS.

Fluid passage 11P includes bypass passages 16FL, 16RR which bypass pressure increasing valves 3FL, 3RR, respectively. Check valves 9FL, 9RR are disposed on bypass passages 16FL, 16RR, respectively. Check valves 9FL, 9RR allow a flow of brake fluid in a direction from wheel cylinders W/C(FL), W/C(RR) toward gear pump PP, and inhibit a flow of brake fluid in a reverse direction from gear pump PP toward wheel cylinders W/C(FL), W/C(RR). Fluid passage 11S includes bypass passages 16FR, 16RL which bypass pressure increasing valves 3FR, 3RL, respectively. Check valves 9FR, 9RL are disposed on bypass passages 16FR, 16RL, respectively. Check valves 9FR, 9RL allow a flow of brake fluid in a direction from wheel cylinders W/C(FR), W/C(RL) toward gear pump PS, and inhibit a flow of brake fluid in a reverse direction from gear pump PS toward wheel cylinders W/C(FR), W/C(RL).

Master cylinder M/C is connected with fluid passages 11P, 11S through fluid passages 12P, 12S, respectively. Fluid passage 11P and fluid passage 12P are merged with each other between gear pump PP and pressure increasing valves 3FL, 3RR. Fluid passage 11S and fluid passage 12S are merged with each other between gear pump PS and pressure increasing valves 3FR, 3RL. Outflow gate valves 2P, 2S are disposed on fluid passages 12P, 12S, respectively, each being a normally open solenoid valve. Fluid passages 12P, 12S include bypass passages 17P, 17S which bypass outflow gate valves 2P, 2S, respectively. Check valves 8P, 8S are disposed on bypass passages 17P, 17S, respectively. Check valve 8P allows a flow of brake fluid in a direction from master cylinder M/C toward wheel cylinders W/C(FL), W/C(RR), and inhibits a flow of brake fluid in a reverse direction from wheel cylinders W/C(FL), W/C(RR) toward master cylinder M/C. Check valve 8S allows a flow of brake fluid in a direction from master cylinder M/C toward wheel cylinders W/C(FR), W/C(RL), and inhibits a flow of brake fluid in a reverse direction from wheel cylinders W/C(FR), W/C(RL) toward master cylinder M/C. Master cylinder M/C and reservoirs 15P, 15S are connected with each other through fluid passages 10aP, 10aS, respectively. Pressure regulating valve 7P is disposed on fluid passage 10aP between reservoir 15P and master cylinder M/C. Pressure regulating valve 7S is disposed on fluid passage 10aS between reservoir 15S and master cylinder M/C. Pressure regulating valves 7P, 7S each have a function of a check valve.

Reservoir 15P is disposed on a suction side of gear pump PP and connected with the suction side of gear pump PP through fluid passage 10bP. Reservoir 15S is disposed on a suction side of gear pump PS and connected with the suction side of gear pump PS through fluid passage 10bS.

Wheel cylinders W/C(FL), W/C(RR) are connected with fluid passage 10bP through fluid passage 13P. Pressure reducing valves 4FL, 4RR each being a normally closed solenoid valve are disposed on fluid passage 13P. Fluid passage 13P and fluid passage 10bP are merged with each other between pressure regulating valve 7P and reservoir 15P. Wheel cylinders W/C(FR), W/C(RL) are connected with fluid passage 12S through fluid passage 13S. Fluid passage 13S and fluid passage 10bS are merged with each other between pressure regulating valve 7S and reservoir 15S. Pressure reducing valves 4FR, 4RL each being a normally closed solenoid valve are disposed on fluid passage 13S.

Next, an operation of pressure regulating valves 7P, 7S respectively disposed adjacent to reservoirs 15P, 15S are explained. In a normal braking condition, that is, in a non-operating condition of the respective valves and pumps, when a brake pressure is generated in master cylinder M/C, pressure regulating valves 7P, 7S are moved to a close position to thereby block fluid communication between master cylinder M/C and reservoirs 15P, 15S. The brake fluid in master cylinder M/C is supplied to wheel cylinders W/C(FL), W/C(RR), W/C(FR), W/C(RL) through fluid passages 18P, 18S. Next, upon executing ABS control, at an initial stage, pressure increasing valves 3FL, 3RR, 3FR, 3RL are moved to a close position, and pressure reducing valves 4FL, 4RR, 4FR, 4RL are moved to an open position. The brake fluid in wheel cylinders W/C(FL), W/C(RR), W/C(FR), W/C(RL) is flowed into reservoirs 15P, 15S through fluid passages 13P, 13S. At this time, the brake fluid flowed into reservoirs 15P, 15S is sucked by pumping action of pump unit P, and then is returned to master cylinder M/C through fluid passages 11P, 11S. Upon executing VDC, outflow gate valves 2P, 2S are moved to a close position, pressure increasing valve(s) 3FL, 3RR, 3FR, 3RL corresponding to desired wheel(s) is moved to an open position, and then pump unit P is operated. In this condition, even when pressure regulating valves 7P, 7S are in the close position, an inside pressure of respective reservoirs 15P, 15S are reduced by sucking action of pump unit P so that pressure regulating valves 7P, 7S are allowed to move to the open position. As a result, the brake fluid is sucked from master cylinder M/C, and then the brake fluid pressurized is supplied to wheel cylinder(s) W/C(FL), W/C(RR), W/C(FR), W/C(RL) corresponding to the desired wheel(s).

[Construction of Housing]

Figure 2A:
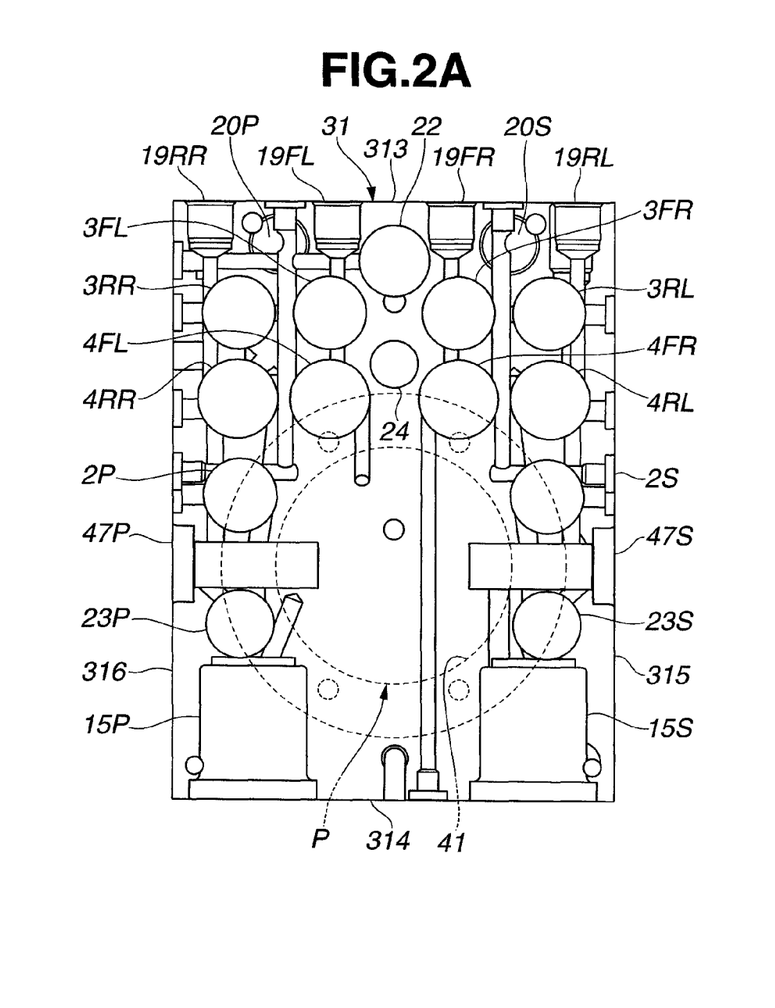
FIG. 2A and FIG. 2B are skeleton diagrams of a housing of the brake apparatus according to the embodiment.
Figure 2B:
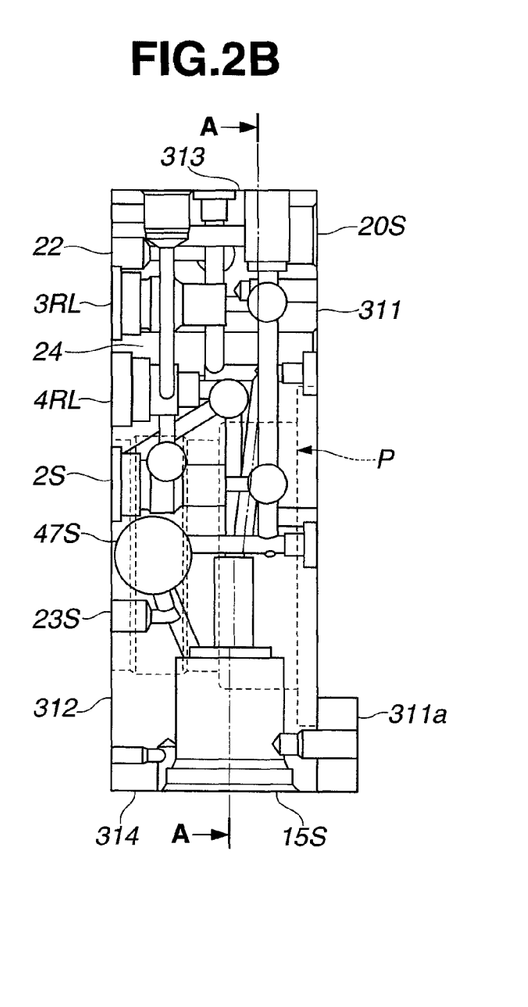

FIG. 2A and FIG. 2B are skeleton diagrams of housing 31 of the brake apparatus according to the embodiment. For simple illustration, FIG. 2A and FIG. 2B show housing 31 from which the respective valves and motor M are dismounted. In the following, a surface to which master cylinder port 20P, 20S are opened is front surface 311, a surface disposed on the opposite side of front surface 311 is rear surface 312, a surface to which wheel cylinder ports 19FL, 19RR, 19FR, 19RL are opened is upper surface 313, a surface disposed on the opposite side of upper surface 313 is lower surface 314, a surface disposed on the left side of front surface 311 when viewed from the side of front surface 311 is left side surface 315, and a surface disposed on the right side of front surface 311 when viewed from the side of front surface 311 is right side surface 316. FIG. 2A is a diagram of housing 31 when viewed from the side of rear surface 312. FIG. 2B is a diagram of housing 31 when viewed from the side of left side surface 315.

Housing 31 has a generally rectangular parallelepiped shape. Motor M is mounted to front surface 311. Mounted to rear surface 312 are the respective solenoid valves, i.e., outflow gate valves 2P, 2S, pressure increasing valves 3FL, 3RR, 3FR, 3RL, pressure reducing valves 4FL, 4RR, 4FR, 4RL, and an electric unit that drivingly controls these solenoid valves. The electric unit includes a circuit board that carries out preset calculation in response to input signals of a wheel speed sensor, etc. disposed on the vehicle, and outputs electrical signals to a solenoid mounted on the respective solenoid valves and motor M. The electric unit is accommodated within a unit case. Housing 31 includes power supply hole 24 that extends through front surface 311 and rear surface 312. The electric unit and motor M are connected with each other by inserting an electrode of motor M to power supply hole 24.

Further, housing 31 includes valve mounting holes to which the respective solenoid valves are mounted by press-fitting or caulking, a plurality of fluid passages connecting the respective ports and the respective solenoid valves with each other, ports connected with the respective cylinders (wheel cylinder W/C(FL), W/C(RR), W/C(FR), W/C(RL) and master cylinder M/C), and a hole in which reservoirs 15P, 15S are respectively disposed. These holes, fluid passages and ports are formed by drilling from an outside of housing 31 into respective surfaces 311 to 316.

Master cylinder port 20P, 20S are formed to be opened to front surface 311 on the side of upper surface 313. Pump unit P is disposed in generally cylindrical accommodating portion 41 that extends through housing 31 from front surface 311 to rear surface 312. An end plate is mounted to one end of accommodating portion 41 to close an opening thereof on the side of rear surface 312. Discharge part accommodating holes 47P, 47S are formed to be opened to left side surface 315 and right side surface 316 in a direction substantially perpendicular to accommodating portion 41, respectively. Disposed within discharge part accommodating holes 47P, 47S, respectively, are check valves 6P, 6S which are connected to discharge fluid passages of pump unit P.

Figure 3:
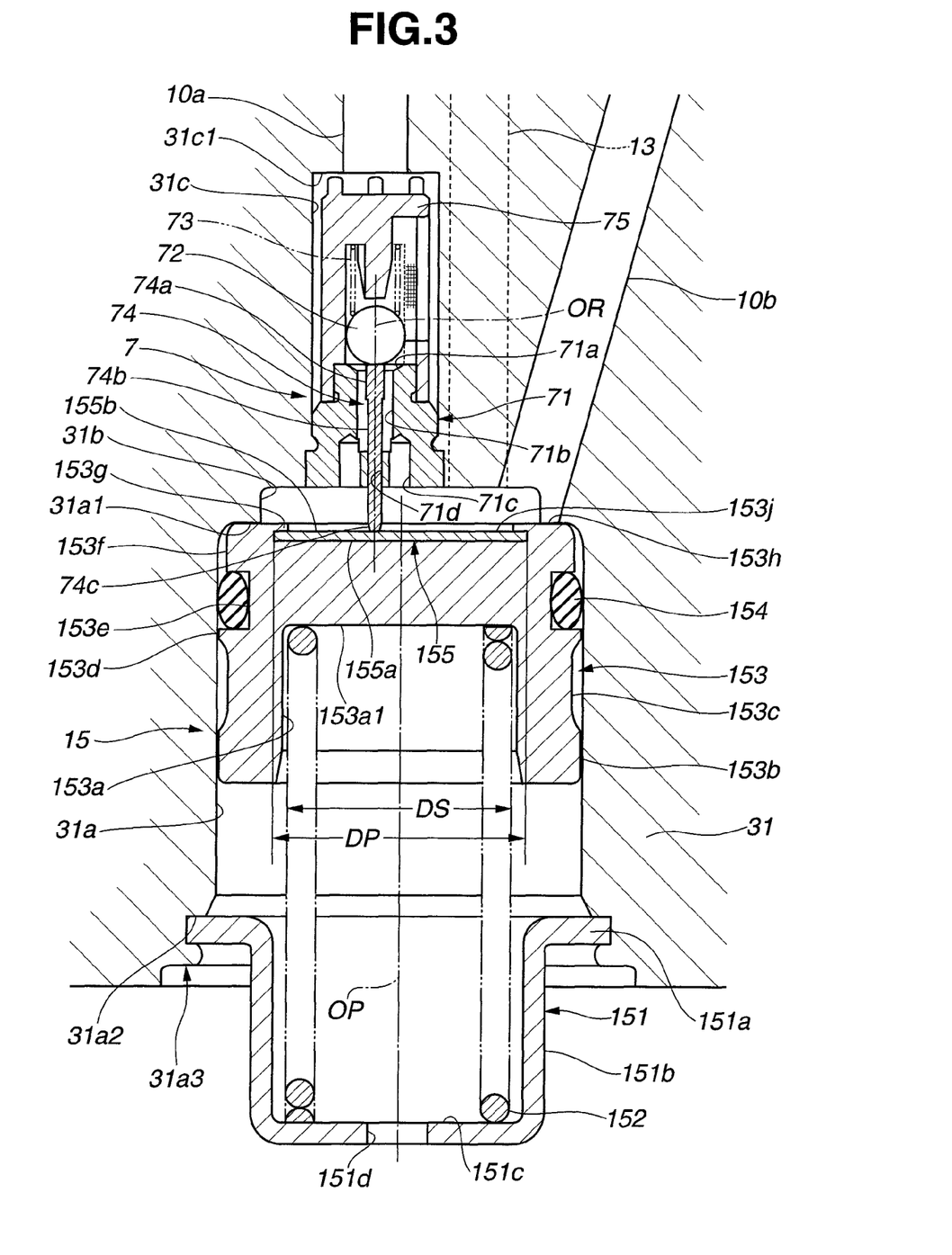
FIG. 3 is an enlarged partial cross section of the brake apparatus according to the embodiment, showing a construction of a reservoir.

FIG. 3 is an enlarged partial cross section of the brake apparatus according to the embodiment, showing a construction of reservoir 15 on the side of the P system. However, reservoir 15 (i.e., reservoir 15S) on the side of the S system is arranged symmetrically to reservoir 15 (i.e., reservoir 15P) on the side of the P system with respect to a vertically extending plane that contains a rotation axis of pump unit P and extends parallel to side surfaces 315, 316 of housing 31. Therefore, in FIG. 3, the symbols P and S respectively indicating the P system and the S system are emitted from the respective reference numerals. As shown in FIG. 3, housing 31 includes cylindrical closed-ended bore 31a that has one closed end and upwardly extends from lower surface 314 of housing 31. Bore 31a accommodates piston body 153 as explained later. Retainer holding surface 31a2 is formed on a lower open end portion of bore 31a on an inner circumferential surface of housing 31 which defines bore 31a. Retainer holding surface 31a2 holds retainer 151 in cooperation with caulking portion 31a3 that is formed in a position lower than retainer holding surface 31a2. Retainer 151 includes cylindrical portion 151b, flange portion 151a extending radially outwardly from an upper end of cylindrical portion 151b so as to be bent relative to cylindrical portion 151b and surrounded between retainer holding surface 31a2 and caulking portion 31a3, and a closed end portion having spring retaining surface 151c on which one end of coil spring (first elastic member) 152 is retained. The closed end portion has air hole 151d extending through a generally central portion of the closed end portion. With the provision of air hole 151d, atmospheric pressure can be always exerted on a lower portion of piston body 153 received in bore 31a.

Piston contact surface 31a1 is formed on the inner circumferential surface that defines bore 31a, on the side of the closed end of bore 31a. Piston contact surface 31a1 is brought into contact with piston surface 153h of piston body 153. Small-diameter cylindrical portion 31b that has a diameter smaller than a diameter of piston contact surface 31a1 is formed in a central portion of the closed end of bore 31a. Small-diameter cylindrical portion 31b is connected with fluid passage 13 communicated with pressure reducing valves 4FL, 4RR and 4FR, 4RL, and with fluid passage 10b communicated with the suction side of pump unit P. Pressure regulating valve accommodating bore 31c is formed on an upper side of small-diameter cylindrical portion 31b. Pressure regulating valve accommodating bore 31c serves as a fluid passage having a diameter smaller than that of bore 31a. Pressure regulating valve accommodating bore 31c has a cylindrical shape having central axis OR that is offset leftward from a central axis of bore 31a, i.e., central axis OP of piston body 153, as shown in FIG. 3. Pressure regulating valve accommodating bore 31c is connected with fluid passage 10a on an upper side thereof which is communicated with master cylinder M/C. Specifically, pressure regulating valve accommodating bore 31c is connected with fluid passage 10a through reduced diameter portion 31c1 that is a bottom of pressure regulating valve accommodating bore 31c. Fluid passage 10a is a small-diameter fluid passage that has a diameter smaller than that of pressure regulating valve accommodating bore 31c, and is arranged in series with respect to pressure regulating valve accommodating bore 31c. Pressure regulating valve accommodating bore 31c serves as a fluid passage having a diameter smaller than that of bore 31a.

Figure 4:
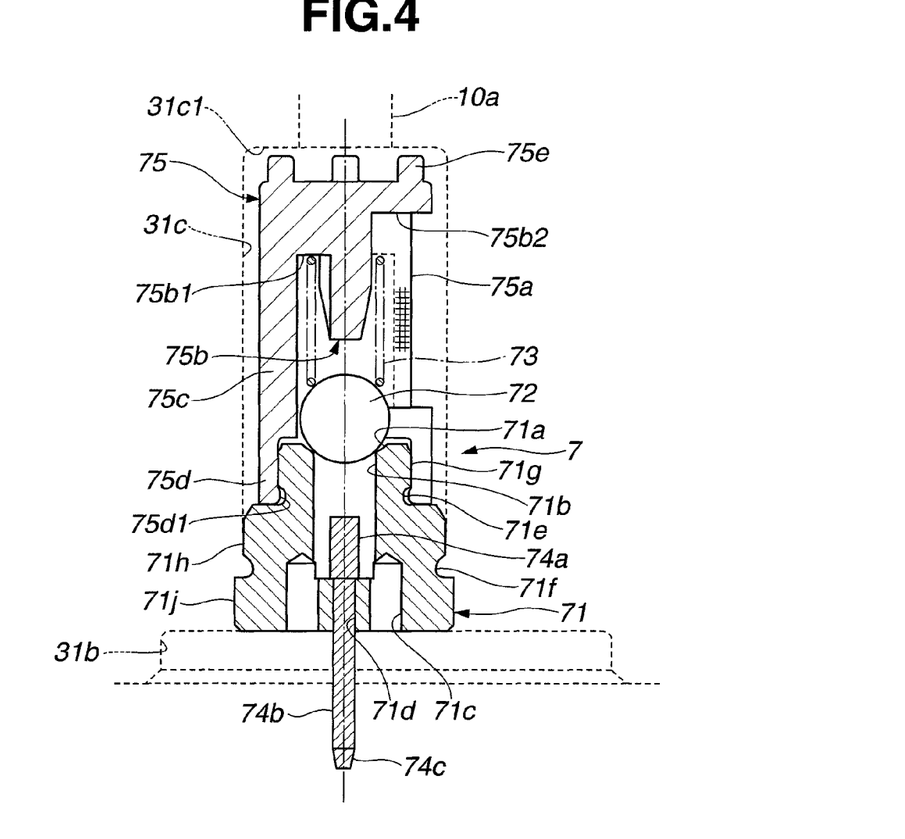
FIG. 4 is an enlarged cross section of a pressure regulating valve of the brake apparatus according to the embodiment.
Figure 5:
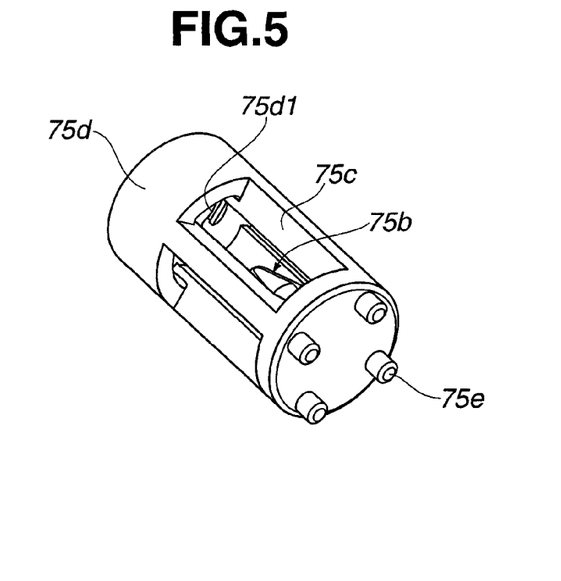
FIG. 5 is a perspective view of a filter member of the pressure regulating valve as shown in FIG. 4.
Figure 6A:
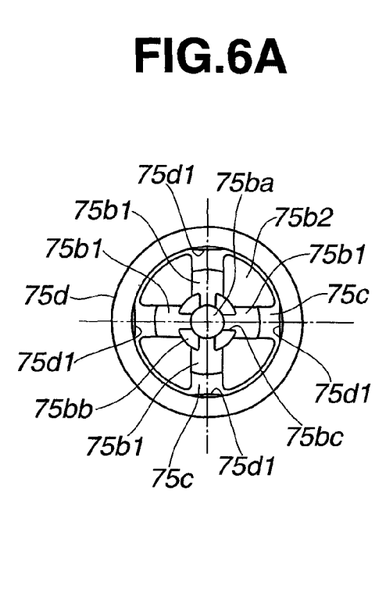
FIG. 6A to FIG. 6C are diagrams showing a detailed construction of the filter member as shown in FIG. 5.
Figure 6B:
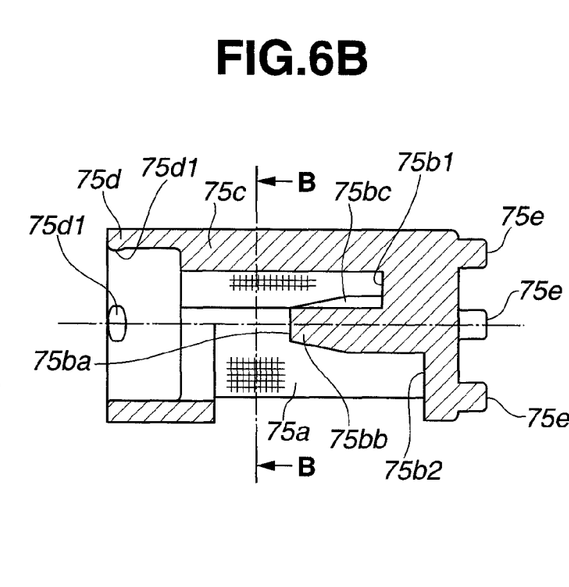
Figure 6C:
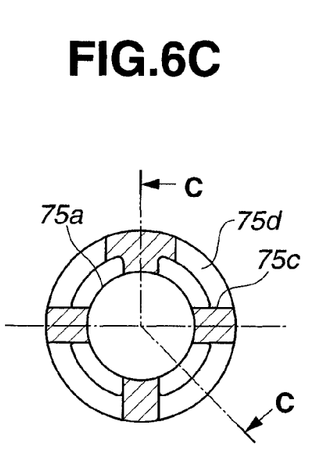

Pressure regulating valve accommodating bore 31c accommodates pressure regulating valve 7 and filter member 75 that removes impurities in the brake fluid flowed from fluid passage 10a into pressure regulating valve accommodating bore 31c. Pressure regulating valve 7 includes seat member 71 fitted to filter member 75 and also serving as a passage forming member or a communication member. FIG. 4 is an enlarged cross section of pressure regulating valve 7. FIG. 5 is a perspective view of filter member 75 of pressure regulating valve 7. FIG. 6A is a bottom plan view of filter member 75. FIG. 6B is a cross section of filter member 75, taken along line C-C shown in FIG. 6C. FIG. 6C is a cross section of filter member 75, taken along line B-B shown in FIG. 6B. FIG. 4 shows pressure regulating valve 7 in a state in which rod 74 of pressure regulating valve 7 is located in a lowest position. Filter member 75 includes cylindrical mesh filter 75a, stop portion 75b acting as a stop for ball member 72 of pressure regulating valve 7, column portion 75c to which filter 75a is mounted, sleeve portion 75d connected with column portion 75c, and projecting portion 75e formed on column portion 75c. Column portion 75c is a framework of filter member 75 and accommodates filter 75a inside thereof. Sleeve portion 75d has an annular shape and is formed on a lower side of column portion 75c. Projecting portion 75e is formed on a crown surface of filter member 75 which is directed toward the side of fluid passage 10a, and ensures a fluid path of the brake fluid flowing from fluid passage 10a to filter 75a through pressure regulating valve accommodating bore 31c. Projecting portion 75e can be brought into contact with reduced diameter portion 31c1 of pressure regulating valve accommodating bore 31c. Even in such a case, projecting portion 75e can ensure the fluid path of the brake fluid flowing from fluid passage 10a to pressure regulating valve accommodating bore 31c. Filter member 75 has an outer diameter smaller than a diameter of pressure regulating valve accommodating bore 31c so that a fluid path between an outer circumferential surface of filter member 75 and a circumferential surface defining pressure regulating valve accommodating bore 31c is formed.

As shown in FIG. 6A to FIG. 6c, stop portion 75b includes cylindrical central stop portion 75ba extending to bottom surface 75b2 of filter member 75 in an axial direction of filter member 75, and four reinforcing portions 75bb that are equidistantly arranged on an outer circumferential surface of central stop portion 75ba. Each of reinforcing portions 75bb has a tapered surface tapered toward the side of sleeve portion 75d in the axial direction of filter member 75. Disposed between respective adjacent reinforcing portions 75bb is vertical groove 75bc extending in the axial direction of filter member 75. Spring retaining surface 75b1 is formed between stop portion 75b and column portion 75c and retains return spring 73 for pressure regulating valve 7. Spring retaining surface 75b1 is located in a position lower than bottom surface 75b2 of filter member 75, and is flush with a bottom of vertical groove 75bc of stop portion 75b. In other words, as shown in FIG. 4 and FIG. 6B, a thickness of filter member 75 at spring retaining surface 75b1 and the bottom of vertical groove 75bc is larger than that at bottom surface 75b2. Further, filter member 75 includes four engaging projections 75d1 that radially inwardly project from an inner circumferential surface of a lower end portion of sleeve portion 75d and are spaced from each other in a circumferential direction of sleeve portion 75d. Filter member 75 is made of a resin material.

Disposed in a space surrounded by an upper portion of seat member 71 and filter member 75 are ball member (valve element) 72 and return spring (second elastic member) 73 that biases ball member 72 toward seat member 71. Return spring 73 has an elastic force smaller than that of coil spring 152 such that in a condition where the brake fluid pressure is not applied to ball member 72, ball member 72 is upwardly pushed by the elastic force of coil spring 152 through rod 74. In this embodiment, return spring 73 is a coil spring. Rod 74 is contacted with ball member 72 such that an axis of rod 74 is in alignment with a center of ball member 72.

Seat member 71 is a cylindrical member having a plurality of steps. Seat member 71 includes upper cylindrical portion 71g to which filter member 75 is fitted, intermediate cylindrical portion 71h having an outer diameter that is larger than that of upper cylindrical portion 71g and substantially a same as the diameter of pressure regulating valve accommodating bore 31c, and lower cylindrical portion 71j having an outer diameter slightly larger than that of intermediate cylindrical portion 71h. Engaging groove 71e is formed between upper cylindrical portion 71g and intermediate cylindrical portion 71h, and engaged with engaging projections 75d1 of filter member 75. Further, fitting groove 71f is formed between intermediate cylindrical portion 71h and lower cylindrical portion 71j, into which the material of housing 31 is fitted upon press-fitting pressure regulating valve 7 into pressure regulating valve accommodating bore 31c. When filter member 75 is assembled to seat member 71, upper cylindrical portion 71g of seat member 71 accommodating rod 74 is inserted into sleeve portion 75d of filter member 75, while retaining return spring 73 and ball member 72 within filter member 75. At this time, engaging projections 75d1 of filter member 75 and engaging groove 71e of seat member 71 are engaged with each other. Filter member 75 and seat member 71 are thus assembled together to form an integral part and constitute pressure regulating valve 7.

Seat member 71 includes through hole portion (rod outer circumferential passage portion) 71b that is formed on one end side of rod 74 (the side of upper end portion 74a). Through hole portion 71b receives rod 74 and cooperates with rod 74 to form a brake fluid passage between an outer circumferential surface of rod 74 and an inner circumferential surface of through hole portion 71b. Seat member 71 further includes rod supporting hole portion 71d that has an inner diameter smaller than an inner diameter of through hole portion 71b and supports the other end side of rod 74 (intermediate portion 74b) such that rod 74 is slidably moveable in rod supporting hole portion 71d in an axial direction of rod 74. Seat member 71 further includes at least one communicating hole portion 71c (in this embodiment, a plurality of communicating hole portions 71c) that communicates through hole portion 71b and small-diameter cylindrical portion 31b of bore 31a with each other. Communicating hole portions 71c are formed in a lower portion of seat member 71 on a radial outside of rod supporting hole portion 71d so as to surround rod supporting hole portion 71d. Communicating hole portions 71c extend upwardly from a lower end of seat member 71, and are partially communicated with a lower end portion of through hole portion 71b. In other words, through hole portion 71b and each of communicating hole portions 71c are overlapped with each other in a radial direction of rod 74, and rod supporting hole portion 71d and each of communicating hole portions 71c are overlapped with each other in the axial direction of rod 74. Through hole portion 71b and each of communicating hole portions 71c are communicated with each other in the overlapping region, whereby a passage construction can be simplified. Frustoconical seat portion 71a is formed on an upper end side of through hole portion 71b which is opposed to ball member 72. When ball member 72 is seated on seat portion 71a, a fluid communication between fluid passage 10a and small-diameter cylindrical portion 31b of bore 31a is inhibited. On the other hand, when ball member 72 is pushed upwardly against the elastic force of pressure regulating return spring 73 by rod 74, the brake fluid supplied through fluid passage 10a is allowed to pass through filter 75a of filter member 75, the brake fluid passage formed between the outer circumferential surface of rod 74 and the inner circumferential surface of through hole portion 71b, and communicating hole portions 71c, and then flow into small-diameter cylindrical portion 31b. By thus using a clearance between the outer circumferential surface of rod 74 and the inner circumferential surface of through hole portion 71b as the brake fluid passage, an effective sectional area of the brake fluid passage can be ensured to thereby reduce a flow resistance in the brake fluid passage. Further, seat member 71 is provided as a separate member from housing 31, and through hole portion 71b (i.e., rod outer circumferential passage portion) and communicating hole portions 71c are formed in seat member 71. As a result, a good formability of the fluid passages can be ensured.

A length of return spring 73 in a non-load condition is set to such a length that return spring 73 can always bias ball member 72 toward seat portion 71a of seat member 71. As explained above, filter member 75 and seat member 71 are formed as an integral part by engaging engaging projections 75d1 and engaging groove 71e with each other. Further, a slight clearance is formed between an upper end of filter member 75 (i.e., an upper end of each of projecting portions 75e) and the bottom 31c1 of pressure regulating valve accommodating bore 31c in order to eliminate an error in assembling. In this condition, even in a case where filter member 75 is disconnected and fallen off from seat member 71 and filter member 75 is brought into contact with the bottom 31c1 of pressure regulating valve accommodating bore 31c, the fluid path between fluid passage 10a and filter 75a can be still ensured by provision of projecting portion 75e, and ball member 72 can be still pressed against seat portion 71a of seat member 71 by the biasing force of return spring 73.

Rod 74 is a rod-shaped member made of metal. Rod 74 includes upper end portion 74a (the other end side of rod 74) that has a diameter larger than the inner diameter of rod supporting hole portion 71d and comes into contact with ball member 72, intermediate portion 74b (one end side of rod 74) that has a diameter substantially the same as the inner diameter of rod supporting hole portion 71d and a length longer than a length of upper end portion 74a, and lower end portion 74c that is gradually tapered from intermediate portion 74b and brought into contact with upper surface 155b of plate member 155 as explained later. Rod 74 is formed as a separate member from piston body 153. When piston body 153 is downwardly moved with a stroke longer than the length of intermediate portion 74b, lower end portion 74c is spaced apart from upper surface 155b of plate member 155. In other words, upper end portion 74a of rod 74 serves as a stop by contacting an upper end of rod supporting hole portion 71d. Further, the length of intermediate portion 74b of rod 74 is set to be longer than a maximum value of a stroke amount of ball member 72 which is equal to a minimum distance between stop portion 75b of filter member 75 and an outer periphery of ball member 72 opposed to stop portion 75b when ball member 72 is seated on seat portion 71a. The length of intermediate portion 74b of rod 74 is also set to be shorter than a maximum value of a stroke amount of piston body 153. When rod 74 is slidably moved in rod supporting hole portion 71d, a sliding contact portion between rod 74 and rod supporting hole portion 71d is displaced every stoke of rod 74. As a result, a durability of rod 74 and seat member 71 can be enhanced. Further, rod 74 has a central axis aligned with central axis OR of pressure regulating valve accommodating bore 31c, and therefore, the central axis of rod 74 is disposed offset from central axis (rotation axis) OP of piston body 153.

Piston body 153 is a resin-molded member having a closed-ended cylindrical shape having inner bottom surface 153a1. An outer circumferential portion of piston body 153 includes upper outer circumferential portion 153f having an outer diameter slightly smaller than an inner diameter of bore 31a, annular grooved portion 153e that is formed on a lower side of upper outer circumferential portion 153f and engaged with annular seal member 154, seal member retaining portion 153d that retains annular seal member 154, reduced-diameter portion 153c formed on a lower side of seal member retaining portion 153d, and weld line formed portion 153b formed on a lower side of reduced-diameter portion 153c. Seal member retaining portion 153d has an outer diameter substantially the same as the inner diameter of bore 31a. Reduced-diameter portion 153c has an outer diameter that is smaller than the inner diameter of bore 31a and substantially the same as the outer diameter of upper outer circumferential portion 153f. Weld line formed portion 153b has an outer diameter substantially the same as the inner diameter of bore 31a. Annular seal member 154 divides an annular clearance between the inner circumferential surface that defines bore 31a and an outer circumferential surface of piston body 153 into a fluid pressure chamber disposed on the upper side of annular seal member 154 and an air chamber disposed on the lower side of annular seal member 154.

The term "weld line" as used herein means a joint mark that is formed upon resin-molding (insert-molding), specifically, that is formed by two flows of a resin material when one of the two flows entering from a position apart from a gate into a mold cavity and the other flow entering into the mold cavity via another route are cooled and solidified while being merged with each other. Generally, the portion in which the weld line is formed tends to suffer from reduction in accuracy. In this embodiment, weld line formed portion 153b is disposed in a position lower than annular seal member 154, that is, in the air chamber. That is, piston body 153 is constructed such that the weld line is formed in a position in which high accuracy in sealability is not required. In other words, piston body 153 is constructed so as to suppress formation of the weld line in a portion in which accuracy in sealability is required.

Inner circumferential surface 153a of piston body 153 has a diameter slightly larger than outer diameter DS of coil spring 152. Inner bottom surface 153a1 of piston body 153 supports the other end of coil spring 152. Plate member 155 is disposed in a central area (i.e., crown surface 153*j*) of piston surface 153*h* formed on an upper surface of piston body 153. Plate member 155 is embedded in crown surface 153*j* by insert-molding. Plate member 155 is a hard member made of metal which has a hardness larger than that of the resin material of piston body 153. In this embodiment, plate member 155 is a disk-shaped member made of stainless steel and has outer diameter DP larger than outer diameter DS of coil spring 152.

Specifically, when the other end of coil spring 152 is retained by inner bottom surface 153*a*1 of piston body 153 made of the resin material, the elastic force of coil spring 152 is always exerted on inner bottom surface 153*a*1. If plate member 155 has an outer diameter smaller than the outer diameter of coil spring 152, plate member 155 and the contact portion of inner bottom surface 153*a*1 which is contacted with the other end of coil spring 152 are spaced apart from each other in a radial direction thereof, when viewed in an axial direction of piston body 153. As a result, a shearing force is exerted on the portion between crown surface 153*j* and inner bottom surface 153*a*1 to thereby cause deterioration in durability of piston body 153. In contrast, in a case where outer diameter DP of plate member 155 is larger than outer diameter DS of coil spring 152 as described in this embodiment, plate member 155 and the contact portion of inner bottom surface 153*a*1 which is contacted with the other end of coil spring 152 are overlapped with each other, when viewed in the axial direction of piston body 153. As a result, crown surface 153*j* undergoes only the elastic force of coil spring 152 and is free from a shearing force, and therefore, deterioration in durability of piston body 153 can be suppressed.

Figure 7:
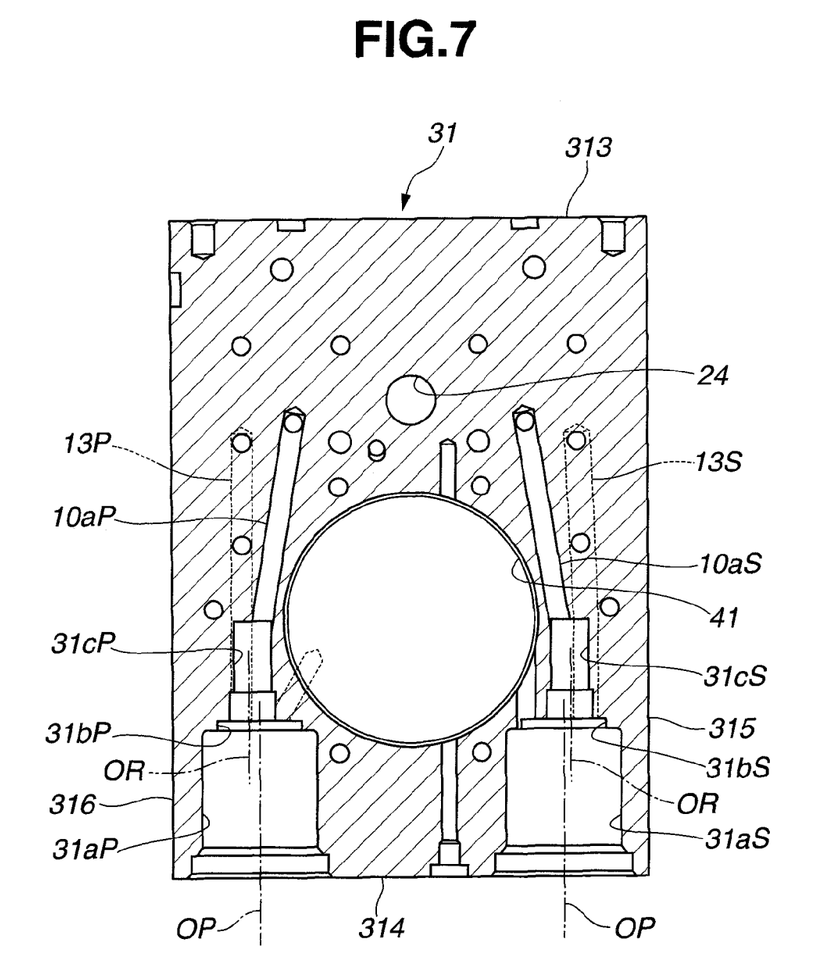
FIG. 7 is a cross section of the housing, taken along line A-A shown in FIG. 2B.

FIG. 7 is a cross section of housing 31, taken along line A-A shown in FIG. 2B. As shown in FIG. 7, closed-ended bore 31*a*P in which reservoir 15P of the P system is accommodated is located on the left side of housing 31, and closed-ended bore 31*a*S in which reservoir 15S of the S system is accommodated is located on the right side of housing 31. Central axis OR of pressure regulating valve accommodating bore 31*c*P communicated with closed-ended bore 31*a*P is located offset leftward from central axis OP of closed-ended bore 31*a*P as shown in FIG. 7. Similarly, central axis OR of pressure regulating valve accommodating bore 31*c*S communicated with closed-ended bore 31*a*S is located offset rightward from central axis OP of closed-ended bore 31*a*S as shown in FIG. 7. In other words, fluid passages 10*a*P, 10*a*S communicated with pressure regulating valve accommodating bores 31*c*P, 31*c*S are formed offset from central axis OP of piston body 153. Thus, pressure regulating valve accommodating bores 31*c*P, 31*c*S are arranged to be offset from respective central axes OP of piston bodies 153 in such a direction that pressure regulating valve accommodating bores 31*c*P, 31*c*S are spaced apart from each other. With this arrangement, a region between pressure regulating valve accommodating bores 31*c*P, 31*c*S can be increased. In addition, accommodating portion 41 in which pump unit P (i.e., rotary gear pumps PP, PS) is accommodated is formed immediately above reservoirs 15P, 15S. A space occupied by accommodating portion 41 is substantially determined on the basis of pump discharge capacity as required. Therefore, with the arrangement of pressure regulating valve accommodating bores 31*c*P, 31*c*S that are offset and spaced apart from each other, freedom of layout of pump unit P (i.e., rotary gear pumps PP, PS) can be enhanced, and upsizing of housing 31 as a whole can be suppressed.

As explained above, the brake apparatus according to the embodiment of the present invention can attain the following functions and effects.

(1) The brake apparatus according to the embodiment includes housing 31 in which pressure regulating valve accommodating bore (fluid passage) 31*c*P, 31*c*S is formed, piston body 153 disposed within closed-ended bore 31*a*P, 31*a*S formed in housing 31 and communicated with pressure regulating valve accommodating bore 31*c*P, 31*c*S, coil spring (first elastic member) 152 that biases piston body 153 toward a closed end of bore 31*a*P, 31*a*S, ball member (valve element) 72 disposed in pressure regulating valve accommodating bore 31*c*P, 31*c*S, seat portion 71*a* that is brought into contact with ball member 72, rod 74 disposed between crown surface 153*j* of piston body 153 and ball member 72, rod 74 acting to move ball member 72 apart from seat portion 71*a*, return spring (second elastic member) 73 having one end contacted with ball member 72 and biasing ball member 72 toward seat portion 71*a*, return spring 73 having an elastic force smaller than that of coil spring 152, rod supporting hole portion 71*d* that supports one end side of rod 74 such that rod 74 is slidably moveable in rod supporting hole portion 71*d* in an axial direction of rod 74, through hole portion (rod outer circumferential passage portion) 71*b* that is disposed on the other end side of rod 74 and has an inner diameter larger than an inner diameter of rod supporting hole portion 71*d*, and at least one communicating hole portion 71*c* that communicates through hole portion 71*b* and bore 31*a*P, 31*a*S.

With this construction, a clearance between the outer circumferential surface of rod 74 and the inner circumferential surface of through hole portion 71*b* can be used as a fluid passage. As a result, it is possible to ensure an effective sectional area of the fluid passage, and therefore, reduce a flow resistance in the fluid passage.

(2) In the brake apparatus according to the embodiment, seat portion 71*a*, rod supporting hole portion 71*d*, through hole portion 71*b* and communicating hole portion 71*c* are formed in passage forming member 71 mounted into pressure regulating valve accommodating bore 31*c*P, 31*c*S. With this construction, these parts can be obtained by forming seat member 71 as a separate member from housing 31. It is possible to ensure the formability.

(3) In the brake apparatus according to the embodiment, through hole portion 71*b* and communicating hole portion 71*c* are overlapped with each other in a radial direction of rod 74. Since through hole portion 71*b* and communicating hole portion 71*c* are communicated with each other in the overlapping region, the passage construction can be simplified. That is, by forming a plurality of hole portions in seat member 71, fluid passages can be provided while supporting rod 74.

(4) In the brake apparatus according to the embodiment, the length of intermediate portion 74*b* of rod 74 is set to be longer than a maximum value of a stroke amount of ball member 72, and is also set to be shorter than a maximum value of a stroke amount of piston body 153. With this construction, when rod 74 is slidably moved, a sliding contact portion between rod 74 and rod supporting hole portion 71*d* is displaced every stroke of piston body 153 so that durability of rod 74 and seat member 71 can be enhanced.

This application is based on a prior Japanese Patent Application No. 2010-271208 filed on Dec. 6, 2010. The entire contents of the Japanese Patent Application No. 2010-271208 are hereby incorporated by reference.

Although the invention has been described above by reference to a certain embodiment of the invention, the invention is not limited to the embodiment described above. Modifications and variations of the embodiment described above will occur to those skilled in the art in light of the above teachings. The scope of the invention is defined with reference to the following claims.

What is claimed is:
1. A brake apparatus comprising:
a housing in which a fluid passage is formed;
a piston body disposed within a closed-ended bore formed in the housing, the bore being communicated with the fluid passage;
a first elastic member that biases the piston body toward a closed end of the bore;
a valve element disposed in the fluid passage;
a seat portion that is brought into contact with the valve element;
a rod disposed between a crown surface of the piston body and the seat portion, the rod acting to move the valve element apart from the seat portion,
a second elastic member having one end contacted with the valve element and biasing the valve element toward the seat portion, the second elastic member having an elastic force smaller than that of the first elastic member,
a rod supporting hole portion that supports one end side portion of the rod such that the rod is slidably moveable in the rod supporting hole portion in an axial direction of the rod;
a rod outer circumferential passage portion formed on a side of an outer circumference of the other end side portion of the rod between the rod supporting hole portion and the seat portion; and
at least one communicating hole portion that communicates the rod outer circumferential passage portion and the bore,
wherein a minimum sectional area between an inner circumference of the rod outer circumferential passage portion and the outer circumference of the other end side portion of the rod is set larger than a sectional area between an inner circumference of the rod supporting hole portion and the outer circumference of the one end side portion of the rod.
2. The brake apparatus as claimed in claim 1, wherein the seat portion, the rod supporting hole portion, the rod outer circumferential passage portion and the at least one communicating hole portion are formed in a passage forming member mounted into the fluid passage.
3. The brake apparatus as claimed in claim 1, wherein the rod outer circumferential passage portion and the communicating hole portion are overlapped with each other in a radial direction of the rod.
4. The brake apparatus as claimed in claim 1, wherein the valve element, the seat portion, the rod and the second elastic member cooperate to form a pressure regulating valve, the brake apparatus further comprising a rotary gear pump operative to suck brake fluid through the pressure regulating valve, wherein the rotary gear pump is disposed in a region between a pair of the pressure regulating valves, and a pair of the fluid passages are formed to be offset from respective central axes of the piston bodies in such a direction that the pair of the fluid passages are spaced apart from each other.
5. The brake apparatus as claimed in claim 4, wherein the rotary gear pump is disposed in a region between the pair of fluid passages.
6. The brake apparatus as claimed in claim 1, further comprising:
a small-diameter fluid passage having a diameter smaller than that of the fluid passage, the small-diameter fluid passage being connected to the fluid passage through a reduced diameter portion of the fluid passage and arranged in series with respect to the fluid passage,
a seat member fixedly disposed within the fluid passage and forming the seat portion;
a closed-ended cylindrical filter member fixed to the seat member and retaining the other end of the second elastic member; and
a plurality of projecting portions formed on a crown surface of the filter member, the projecting portions being engaged with the reduced diameter portion of the fluid passage to allow the brake fluid to flow from the small-diameter fluid passage to the fluid passage.
7. The brake apparatus as claimed in claim 6, wherein the seat portion, the rod supporting hole portion, the rod outer circumferential passage portion and the communicating hole portion are formed in the seat member.
8. The brake apparatus as claimed in claim 7, wherein the rod outer circumferential passage portion and the communicating hole portion are overlapped with each other in a radial direction of the rod.
9. The brake apparatus as claimed in claim 1, wherein the second elastic member is a coil spring, a length of the coil spring in a non-load condition being set such that the coil spring is always capable of biasing the valve element toward the seat portion within the fluid passage.
10. The brake apparatus as claimed in claim 1, wherein the piston body is a resin-molded member and has a hard member on a crown surface thereof, the hard member having a hardness larger than that of a resin material of the piston body, and the piston body and the rod are brought into contact with each other via the hard member.
11. The brake apparatus as claimed in claim 10, wherein the hard member is a plate member, the plate member being integrally formed with the piston body.
12. The brake apparatus as claimed in claim 11, wherein the plate member has a disk shape, the first elastic member is a coil spring, the piston body has a closed-ended cylindrical shape, the coil spring is supported by an inner bottom surface of the piston body, and the plate member has a diameter larger than an outer diameter of the coil spring.
13. The brake apparatus as claimed in claim 12, wherein the plate member has a diameter larger than a maximum stroke amount of a ball member of the piston body.
14. A brake apparatus comprising:
a housing in which a fluid passage is formed;
a piston body disposed within a closed-ended bore formed in the housing, the bore being communicated with the fluid passage;
a first elastic member that biases the piston body toward a closed end of the bore;
a valve element disposed in the fluid passage;
a seat portion that is brought into contact with the valve element;
a rod disposed between a crown surface of the piston body and the seat portion, the rod acting to move the valve element apart from the seat portion,
a second elastic member having one end contacted with the valve element and biasing the valve element toward the seat portion, the second elastic member having an elastic force smaller than that of the first elastic member, and
a communication member disposed in the fluid passage, the communication member comprising:
a rod supporting hole portion that supports one end side portion of the rod such that the rod is slidably moveable in the rod supporting hole portion in an axial direction of the rod;

a rod outer circumferential passage portion formed on a side of an outer circumference of the other end side portion of the rod between the rod supporting hole portion and the seat portion; and at least one communicating hole portion that communicates the rod outer circumferential passage portion and the bore, wherein a minimum sectional area between an inner circumference of the rod outer circumferential passage portion and the outer circumference of the other end side portion of the rod is set larger than sectional area between an inner circumference of the rod supporting hole portion and the outer circumference of the one end side portion of the rod.

15. The brake apparatus as claimed in claim 14, the rod outer circumferential passage portion and the communicating hole portion are overlapped with each other in a radial direction of the rod.

16. The brake apparatus as claimed in claim 15, wherein the valve element, the seat portion, the rod and the second elastic member cooperate to form a pressure regulating valve, the brake apparatus further comprising a rotary gear pump operative to suck brake fluid through the pressure regulating valve, and a motor that is mounted to a front surface of the housing and drives the rotary gear pump, wherein the rotary gear pump is disposed in a region between a pair of the pressure regulating valves, and a pair of the fluid passages are formed to be offset from respective central axes of the piston bodies corresponding to the pair of the fluid passages in such a direction that the fluid passages are spaced apart from each other.

17. A brake apparatus comprising:

a housing in which a fluid passage is formed;

a piston body disposed within a closed-ended bore formed in the housing, the bore being communicated with the fluid passage;

a first elastic member that biases the piston body toward a closed end of the bore;

a valve element disposed in the fluid passage;

a seat portion that is brought into contact with the valve element;

a rod disposed between a crown surface of the piston body and the seat portion, the rod acting to move the valve element apart from the seat portion, a second elastic member having one end contacted with the valve element and biasing the valve element toward the seat portion, the second elastic member having an elastic force smaller than that of the first elastic member, a rod supporting hole portion that supports one end side portion of the rod such that the rod is slidably moveable;

a rod outer circumferential passage portion formed on a side of an outer circumference of the other end side portion of the rod between the rod supporting hole portion and the seat portion along an axial direction of the rod, and at least one communicating hole portion that communicates the rod outer circumferential passage portion and the bore, wherein a minimum sectional area between an inner circumference of the rod outer circumferential passage portion and the outer circumference of the other end side portion of the rod is set larger than a sectional area between an inner circumference of the rod supporting hole portion and the outer circumference of the one end side portion of the rod.

18. The brake apparatus as claimed in claim 17, wherein the rod outer circumferential passage portion and the communicating hole portion are overlapped with each other in a radial direction of the rod.

19. The brake apparatus as claimed in claim 18, wherein the rod supporting hole portion and the communicating hole portion are overlapped with each other in the axial direction of the rod.

20. The brake apparatus as claimed in claim 18, wherein the communicating hole portion is formed on an outer circumferential side of the rod supporting hole portion.

* * * * *